Sept. 2, 1969   J. H. B. GEORGE ET AL   3,464,860
RECOMBINATION SYSTEMS FOR SEALED SECONDARY BATTERIES
AND BATTERIES INCORPORATING THEM
Filed Dec. 30, 1966   2 Sheets-Sheet 1

James H. B. George
Albert E. Dennard
Ekkehard L. Kreidl
INVENTORS

BY *Bernie A. Lyppen*

Attorney

Sept. 2, 1969    J. H. B. GEORGE ET AL    3,464,860
RECOMBINATION SYSTEMS FOR SEALED SECONDARY BATTERIES
AND BATTERIES INCORPORATING THEM
Filed Dec. 30, 1966    2 Sheets-Sheet 2

James H. B. George
Albert E. Dennard
Ekkehard L. Kreidl
INVENTORS

United States Patent Office 3,464,860
Patented Sept. 2, 1969

3,464,860
RECOMBINATION SYSTEMS FOR SEALED SECONDARY BATTERIES AND BATTERIES INCORPORATING THEM
James H. B. George and Albert E. Dennard, Cambridge, and Ekkehard L. Kreidl, Wayland, Mass., assignors to Arthur D. Little, Inc., Cambridge, Mass., a corporation of Massachusetts
Filed Dec. 30, 1966, Ser. No. 606,419
Int. Cl. H01m 1/08, 47/00, 45/04
U.S. Cl. 136—6                                    13 Claims

ABSTRACT OF THE DISCLOSURE

This invention relates to sealed batteries, and more particularly to sealed secondary or rechargeable batteries which evolve hydrogen and/or oxygen gases especially during the time when they are being charged. A recombination system is incorporated into the battery which effects a reaction between the hydrogen and oxygen and returns the product water to the electrolyte.

In a copending application Ser. No. 606,418, filed Dec. 30, 1966, filed in our names we have disclosed a recombination system, for use with sealed secondary batteries, which incorporates a flue member in which a recombination-effecting means is located.

It has long been known that the gases formed in secondary batteries build up pressure within the battery casing. This makes it necessary to permit at least a portion of these gases to escape. This, in turn, requires that water lost in the decomposition must be periodically replaced in the electrolyte. This fact has, in turn, somewhat limited the use of secondary batteries as power sources, even though there are many devices which could advantageously be powered by them. For example, certain industrial and domestic power tools and small portable household appliances and other devices could very conveniently be powered by secondary batteries except for the fact that these batteries cannot in general be formed into an essentially completely sealed power pack as can be the more expensive primary or dry-cell batteries. One method of solving the gassing problem in secondary batteries is to arrange the capacities of the electrodes so that, under normal conditions, oxygen alone is evolved at the anode. This oxygen can then be caused to be electrochemically reduced at the cathode. This technique was developed by Neumann (U.S. Patents 2,571,-927 and 2,636,058) and has formed the basis for the development of sealed rechargeable nickel-cadmium and silver-cadmium batteries. It is, however, restricted to battery systems having alkaline electrolytes and cadmium cathodes. Such systems tend to have a higher cost and therefore more limited application than batteries based on the lead, lead dioxide couple.

It should be pointed out that the term "sealed battery" is used to designate a battery which normally does not vent gas, but which may have a safety or relief valve adjusted to release gas to the atmosphere when it has reached a certain specified level of pressure. Therefore, the term is used hereinafter to designate a battery which will not normally vent any gas to the atmosphere and which can operate over long extended periods of time without maintenance and without the need for adding water to the electrolyte.

Other approaches to the problem of making sealed secondary batteries have included providing means for recombining, within the battery, at least a portion of the hydrogen and oxygen gases to form water and for returning the product water to the electrolyte. This has been done generally by including in the battery housing a catalyst or a hot wire to effect the recombination of that portion of the gases which could readily react. In many of the arrangements the remaining uncombined gases are vented from the battery casing to the atmosphere, a fact which means that the resulting batteries are not really sealed. It has been realized in the prior art devices that it is necessary to protect whatever catalyst is used from the corrosive effects of the electrolyte, e.g., a strong alkaline liquid or acid such as sulfuric acid. This has been done by enclosing the catalyst in a labyrinthian arrangement (U.S. Patent 2,465,202) or by using narrow passageways which were essentially gas-permeable but liquid-impermeable. Another approach to the problem has been to gel the electrolyte. These approaches to the problem of catalyst protection are, however, not completely satisfactory solutions, for the constant tipping of such batteries, shaking, or mishandling can result in bringing a liquid electrolyte in contact with the catalyst surface. Moreover, batteries having a gelled electrolyte frequently have attenuated lifetimes.

Early in the prior art work on recombination it was realized that hydrogen and oxygen were not always produced in a stoichiometric ratio in the decomposition which occurred during charging. This fact, in turn, has resulted in the use of relatively complicated equipment to solve the problem of this possible imbalance in gas proportions. As an example, one system proposed as a solution to the problem requires the incorporation of a relatively complex and expensive auxiliary electrode into the battery along with its associated circuitry. The purpose of the auxiliary electrode is automatically to generate within the battery whichever of the gases is in short supply and is needed to furnish a stoichiometric quantity. Such an electrode is described, for example, in U.S. Patent 2,578,027.

It has also been recognized that it would be highly desirable to protect the catalyst surface from the water which is formed, or to provide means for drying the catalyst surface (see for example U.S. Patent 2,465,202). Thus heating the catalyst is part of the prior art teaching.

However, each of the prior art devices has apparently presented one or more problems of such a serious nature that it has not been found practical to make a safe, sealed battery which may be used for a wide range of applications, despite the fact that there is a real need for such a battery.

Brief summary

This invention provides a recombination system for use with a sealed secondary battery. The system is such that the hydrogen and oxygen gases are effectively combined and the product water is returned to the electrolyte. The recombination system comprises a separate fluid chamber within the battery housing which has an externally-operated valve means for controlling the passage of fluids in and out of the chamber. Within the fluid chamber is a catalyst or a hot wire. Because the sudden onrush of gases against the catalyst or wire may cause an explosion, gas onrush preventing means may be provided. These include small beads or the like, which also serve as flash suppressors, means to control the rate at which the valve is opened and a gas-permeable, liquid-impermeable membrane to reduce the pressure differential existing across the wall or walls defining the fluid chamber.

It is therefore a primary object of this invention to provide a sealed secondary battery which may remain sealed throughout its useful life and require no maintenance or additional quantities of electrolyte. It is another object of this invention to provide a battery of the character described which is relatively simple and inexpensive to construct. It is another object of this invention to provide a battery of the character described which may be made in a number of different forms and in a wide size range. It is still another object of this invention to provide a sealed secondary storage battery which may be used in a number of applications not presently considered possible for secondary batteries. It is still another object to provide such a battery which is safe to use in any desired orientation, even if it is to be inverted, shaken or otherwise mishandled in use. Other objects of the invention will in part be obvious and will in part be apparent hereinafter.

The invention accordingly comprises the features of construction, combination of elements and arrangement of parts which will be exemplified in the constructions hereinafter set forth; and the scope of the invention will be indicated in the claims.

Contrary to the previous belief that a sealed secondary battery had to have the amount of hydrogen and oxygen maintained in stoichiometric ratios or be so designed as to be able to vent the excess of one or the other of these gases to the atmosphere, we have found that if a battery casing is made to withstand reasonable pressures over the range of about 25 to 60 p.s.i.g. or more (depending upon use and desired lifetime) there need not be any adjustments made in the relative quantities of hydrogen and oxygen within the battery so long as there is an efficient recombination system present. Rather, during the course of operation, the equilibrium will shift back and forth such that over a period of time the amounts of these two gates are adjusted to essentially stoichiometric ratios. Thus, we have found that it is not necessary to provide an auxiliary electrode to adjust the stoichiometry of the system, although one may be desirable in specific battery constructions.

We have found, however, that efficient recombination can be achieved by positioning a suitable recombination-effecting member (e.g., a catalyst or a hot wire) within a separate fluid chamber located above the electrolyte level in the battery chamber, the fluid chamber having at least one fluid port which may be opened and closed by an externally-actuatable valve. When the valve closes off the flow of fluid into the separate fluid chamber the gases as they are generated within the battery build up pressure. There is, therefore, the possibility that when the valve is opened there will occur a sudden onrush of gases into the separate fluid chamber. Since this may give rise to an explosion it is necessary to provide some form of explosion preventing means. For example, the valve which controls the flow of fluid into the enclosed chamber may be so designed and constructed as to limit the rate of fluid flow into the recombination system chamber until the pressures in the battery casing and in the chamber are approximately equal. If it is not convenient to use such a valve, or if an additional safety feature is desired, then suitable flash-suppressing means may be placed in the chamber in association with the recombinaion-effecting means. As will be seen in connection with the description of the drawings, these flash-suppressing means may take the form of beads, rods, saddles, gauze, and the like. The materials from which they are constructed should be resistant to the electrolyte used.

In place of, or in addition to, the use of flash-suppressing means or controllable valve means the chamber may be in fluid communication with the interior of the battery casing through a membrane (or other suitable device) which is gas-permeable but fluid-impermeable. Such an arrangement minimizes the pressure differential in the two volumes.

By enclosing the recombination-effecting means in a separate chamber and by providing for the external control of the flow of fluids into the chamber, it is possible to protect the recombination-effecting means from the electrolyte and to choose precisely the time periods in the battery operation during which recombination takes place such as during charging or scheduled standby in a secured position.

For a fuller understanding of the nature and objects of the invention reference should be had to the following detailed description taken in connection with the accompanying drawings in which FIG. 1 is a side elevational view, partly in cross section, of a typical secondary battery incorporating the recombination system of this invention;

Figure 1:
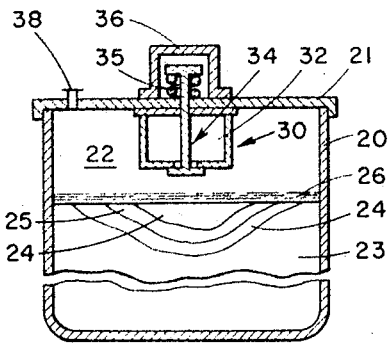

FIG. 1 illustrates how the recombination system of this invention may be incorporated in a typical lead acid storage battery. Although a single cell is shown, it will be appreciated that batteries of this type normally comprise a plurality of cells; and FIGS. 6 and 7, to be described below, will illustrate a recombination system for a multiple-celled battery. Since the construction of the battery itself is not part of the invention, many of the well-known battery details such as external electrodes, connecting members and the like have been omitted from the drawing in FIG. 1. The battery of FIG. 1 is formed of a battery case or housing 20 having a fluid-tight cover 21. Within the battery housing is the actual battery chamber 22 and it contains, in the usual manner, a series of electrodes or plates. Typically, these include a negative plate 23, a separator 24 and a positive plate 25. This arrangement may, of course, be repeated as many times as desired. A suitable electrolyte 26 fills a major portion of the battery chamber. This electrolyte may be either a liquid or may be in gelled form in accordance with known practices.

In FIG. 1 the recombination system, to be described in detail, is generally indicated by the numeral 30. It defines a recombination chamber 32 which contains the recombination-effecting means into which the gaseous hydrogen and oxygen are introduced and the product water withdrawn through a suitable fluid pjassage controlled by an externally actuated valve means 34. Spring 35 is associated with the valve means and its purpose is to maintain the valve in a closed position during those periods of time (normally during discharging) when little, if any, gas is being generated by the battery. In the closed position as shown in FIG. 1 the externally actuatable valve has a protective cover 36; and the battery cover 21 has a relief valve 38 which is set to release gas within the battery should it ever build up to a pressure above a specified level. Normally, of course, the relief valve 38 will not be used.

Figure 2:
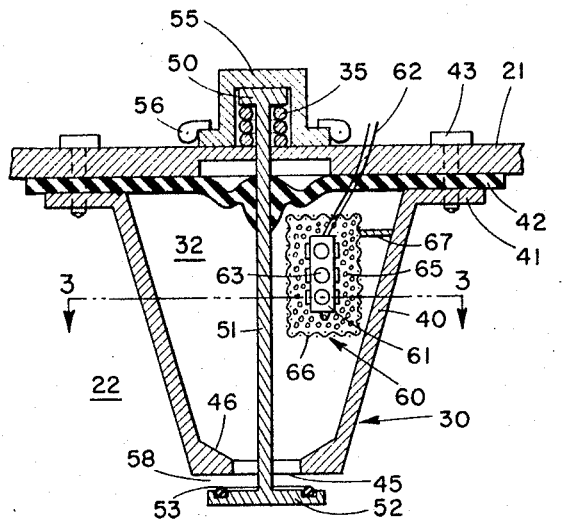
FIG. 2 is a detailed cross section of one embodiment of the recombination system of this invention showing the use of flash-suppressing means and a catalyst as a recombination-effecting element.
Figure 3:
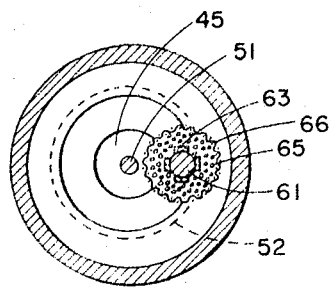
FIG. 3 is a cross section of FIG. 2 taken along line 3—3 of that figure.

FIG. 2 illustrates one embodiment of the recombination system of this invention. In this embodiment the recombination effecting means takes the form of a heated catalyst and flash-suppressing means are provided. As will be apparent, the recombination system chamber housing may take any of a number of suitable configurations, the one illustrated in FIGS. 2 and 3 being in the form of a frustoconical shape. Thus the system is enclosed with a wall 40 having an upper flange 41, which is used to attach the recombination chamber to the battery cover 21 through an elastomeric gasket member 42 by suitable means such as screws 43. Within the bottom of the housing is an opening 45, and the interior of the housing has a lower inclined wall section 46 to insure the ready flow of the product water back into the battery chamber.

The externally operated valve 34 is comprised of an external pressure applying plate 50, a rod 51, which passes through and is sealed by the elastomeric sealing member 42, and a valve plate 52 which has an O-ring seal 53. The recombination system of FIG. 2 is shown in the open position such as it would be in when placed upon a charging rack to permit the gases generated during the charging to contact the catalyst to form water vapor. Under such a circumstance there would conveniently be a socket 55 located on the charging rack. This socket is designed to fit down on the pressure-applying member 50 and to force the valve rod 51 downward against the action of the spring 35 and to maintain it in this position through the use of suitable clamps such as 56. With the valve plate 52 in its lowermost position there is defined a fluid passage 58 which provides fluid communication between the battery chamber 22 and the recombination system chamber 32. Within the recombination chamber 32 there is located the recombination-effecting means 60, which may be either a catalyst which is capable of catalysing the reaction between gaseous hydrogen and oxygen or a heated wire. In FIG. 1 this recombination-effecting means 60 is shown as a catalyst which is comprised of a resistor heating element 61, its associated electrical lead wires 62 and catalyst pellets 63 adhered to the resistor body surface. The resistor is formed of a suitable electrically conducting material capable of developing resistance heating, such as a carbon resistance element, and the catalyst possesses the necessary surface characteristics to catalyze the $2H_2+O_2$ reaction. Palladinized alumina pellets adhered to the resistor elements by an epoxy adhesive are particularly well suited for the purpose. Other catalysts such as platinum, rhodium, ruthenium and other members of the precious metals group may also be used.

Inasmuch as it is necessary to prevent a sudden onrush of hydrogen and oxygen gases against the surface of the recombination-effecting means it is necessary to provide means for accomplishing this. In the recombination system of FIG. 2 the means of preventing the onrush of gases and their sudden contacting of the catalyst, when the valve plate 52 is moved downwardly, comprise small individual configurations which may also serve as flash-suppressing means when necessary. Such onrush preventing means, referred to hereinafter as flash-suppressing means, are illustrated in FIG. 2 as beads 65 surrounding the catalyst. Such flash-suppressing means may also, of course, take the form of rods, saddles, small tubes, gauze and the like. They may be constructed of any suitable material the only requirement being that it is resistant to the electrolyte used and to the atmosphere obtaining within the battery. They may be formed of glass, lead, plastics, ceramics, etc. It may be desirable that the flash suppressing means have hydrophobic surfaces. One way of accomplishing this is to coat their surfaces with a material such as polytetrafluoroethylene.

In order to function efficiently, the flash-suppressing means should essentially totally surround the recombination-effecting means (e.g., the catalyst system of FIG. 2), and the depth of this surrounding material is dependent upon the dimensions of the flash-suppressing means and the onrush protection required for any battery design. In the arrangement of FIG. 2 this is accomplished by containing the beads 65 in a coarse foraminous container, such as a basket 66 made of a suitable foraminous material, i.e., resin coated wire screening. Such a container may be supported by a suitable means such as a bracket 67 attached to the chamber wall 40.

It is desirable that the pressure drop, which is experienced by the gases across the flash-suppressing means, be kept at a minimum. This, therefore, dictates that the foraminous container 66 be relatively coarse and that the small individual forms serving as the flash-suppressing means be such as to define suitable passageways between them. The size and shape of these individual forms serving as flash-suppressing means will generally be that which optimizes their performance as flash suppressors and at the same time minimizes pressure drop. It has been found that beads which just pass through a standard 12-mesh screen (i.e., have a diameter of about 0.055 inch and form a one-fourth inch barrier around the catalyst achieve this compromise between minimizing pressure drop and maximizing flash suppression.

Although the mechanism by which beads, or other flash-suppressing forms, achieve the desired results is not completely understood, it has been observed that their presence around the catalyst (or heated wire) prevents any flashbacks which may occur if the difference in the pressures existing in the battery and in the recombination chamber is particularly great when the valve is opened. This is in addition to their ability to prevent onrush. It is believed that this added advantage gained in the use of flash-suppressing means may be a function of a combination of surface area of the beads (or other forms) and the size of the passages defined between them. It is therefore preferable that any flash-suppressors used as onrush-preventing means have a total surface area approximately equivalent to that generated by 12-mesh beads when surrounding the recombination-effecting means to a depth of at least about one-fourth inch with respect to all of its significantly active surfaces, and have gas passages of the same order of magnitude as generated by such 12-mesh beads.

Figure 4:
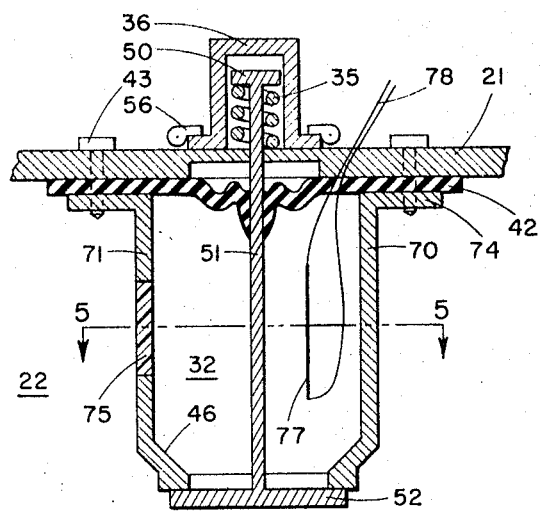
FIG. 4 is a detailed cross section of another embodiment of the recombination system of this invention showing the incorporation of a gas-permeable, liquid-impermeable membrane and the use of a hot wire as a recombination-effecting element.
Figure 5:
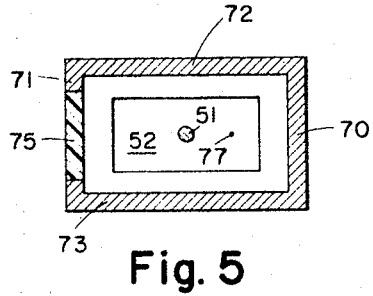
FIG. 5 is a cross section of FIG. 4 taken along line 5—5 of that figure.

The modification illustrated in FIGS. 4 and 5 has a rectangular-shaped recombination chamber formed of 4 side walls 70, 71, 72, and 73. The upper portion of these walls terminates in a flange 74 which permits the attachment of the recombination system to the battery covering 21 in the manner described for the embodiment of FIG. 2. A portion of wall 71 is replaced by a gas permeable membrane 75. This membrane serves as an onrush preventing means and hence may be used in place of the flash-suppressing means of FIG. 2. It may also be used in addition to the flash-suppressing means. The membrane serves as an onrush preventing means by continuously minimizing the pressure differential between volumes 22 and 32. As a specific example of a membrane we may cite a fluorinated vinyl having an average pore size of 0.45 micron and a maximum pore size of 1.5 microns. Such a material is impermeable to water up to about 35 p.s.i.g, but is readily permeable to gases. It has a rated gas flow of about 6000 cc./minute/square centimeter at a pressure difference of 13.5 p.s.i. Suitable membranes may also be constructed from other synthetic resin materials, particularly from other fluorinated hydrocarbons, e.g., polytetrafluoroethylene and polyfluoroethylene. They may also be made of waterproof porous carbon or graphite, or waterproof porous ceramics, treated for example with acid-resistant waxes. The materials for these membranes are commercially available and the choice will be determined by the operating conditions encountered—e.g., pressures, flow rates, electrolyte, etc. It is of course, within the scope of this invention to use more than one of these membranes, if desired. Inasmuch as the membrane 75 is designed to achieve equilibration of the gas pressures in the recombination system chamber 32 with that in the battery chamber 22, it will usually not be necessary to use flash-suppressing means in the arrangement shown in FIGS. 4 and 5. This is brought about by the fact that the pressure differential existing across the walls of the recombination chamber can be minimized by the proper choice of the membrane 75 so that the onrush of gas into the chamber 32 with the opening of the valve will be entirely prevented or at least reduced so as not to give rise to any explosions.

The recombination-effecting means of FIG. 4 is shown to be a heated wire 77, such as platinum or platinized wire, having suitable lead wires 78 extending through the battery cover 21 for connection with a suitable electrical source.

Figure 6:
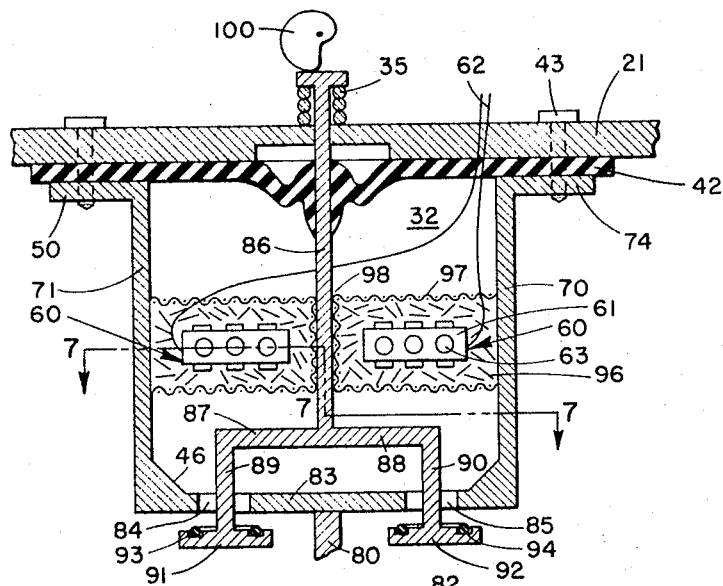
FIG. 6 is a detailed cross section of a recombination system constructed in accordance with this invention and adapted for use with a multiple-cell battery.
Figure 7:
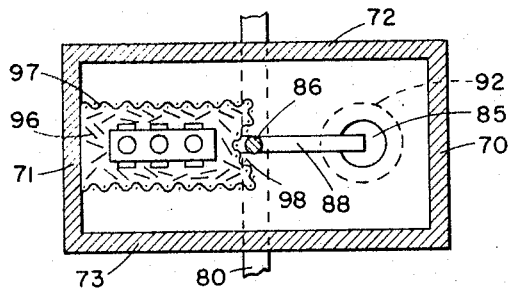
FIG. 7 is a cross section of FIG. 6 taken along line 7—7 of that figure.

The modification illustrated in FIGS. 6 and 7 is designed to permit a single recombination system chamber to serve more than one battery cell. Normally, a secondary storage battery will contain a plurality of cells and it is desirable that these be so isolated as to prevent any transfer of electrolyte from one cell to the other. Thus in the arrangement of FIG. 6 there is shown in fragmentary form a cell divider 80 which isolates cells 81 and 82. The recombination system of FIGS. 6 and 7 is shown as a rectangularly shaped enclosed chamber similar to that of FIGS. 4 and 5. In all these figures, like numbers refer to like elements. The chamber has a bottom panel 83 which rests on cell divider 80. In this bottom plate are two ports 84 and 85 providing fluid communication with cells 81 and 82, respectively. The valve stem 86 terminates in arms 87 and 88 which in turn have valve rods 89 and 90 attached. These valve rods support closing members 91 and 92, having O-ring seals 93 and 94, respectively. Thus when pressure is applied on member 50 external of the battery housing ports 84 and 85 are opened to permit gases to enter chamber 32. Two identical catalyst systems 60 are provided in this modification. However, it is also possible to use but one catalyst to catalyze the reaction between the oxygen and hydrogen gases from more than one cell. The catalysts are of the same type as described in conjunction with FIG. 2.

Since there exists the possibility that the gases will enter the chamber, when the valves are opened, at a rate sufficient to give rise to an explosion, the catalyst system are surrounded by flash-suppressing means which serve, as in FIG. 2, as the onrush-preventing means. Small ceramic rod members 96 completely surround the catalysts and are contained within a foraminous basket 97 which has an opening 98 for the rod 86 to move in.

As an alternative to the use of the flash-suppressing means, or in addition to it, the apparatus may have means associated with the externally-actuatable valve to control the rate at which the gases enter chamber 32 through ports 84 and 85. This control means is illustrated in FIG. 6 as cam 100 which applies pressure on the pressure applying member 50 in such a sequence as to barely open or crack the valve at first. This controls the rate at which the gases enter chamber 32 and prevents their sudden onrush in the chamber.

Under some circumstances it may be desirable to have the recombination system external of the battery, that is, affixed to a charge rack. For example, if the battery is to be used only periodically, it may not be desirable to incorporate the recombination system within the battery. In such a case, it may be attached to the charge rack in such a way that when the battery is installed in the charge rack the recombination system will be in workable engagement with the interior volume of the battery. Many modifications of such an arrangement are, of course, possible and the one shown in FIG. 8 is given as illustrative and is not meant to be limiting.

Figure 8:
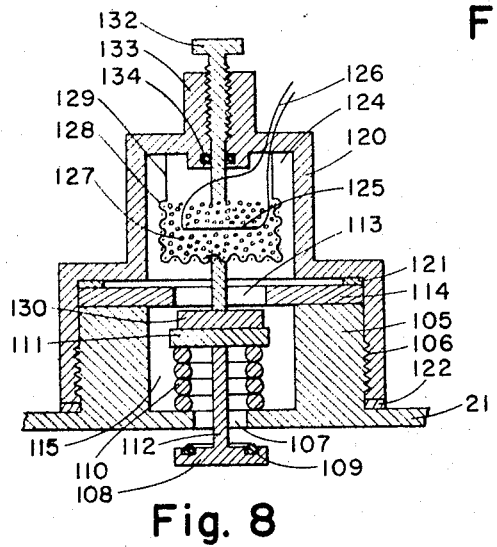
FIG. 8 is a cross section of a recombination system suitable for attaching to the outside of the battery.

In the arrangement of FIG. 8 the battery cover 21 has a vertically-extending collar member 105 with external threads 106. When the battery is not on the charge rack the opening 107 in the battery cover 21 is closed off and the battery is maintained as a fluid-tight entity by means of a valve member 108, which contains a suitable sealing ring 109, engaging the interior wall of the battery cover 21. The necessary force to maintain the valve closed is applied by spring 110 acting upwardly against a closure disk 111 connected with valve closing member 108 through a valve stem 112. When the battery is not on the charge rack, the disk 111 moves into position to close opening 113 in the shoulder 114 which is affixed to collar 105, thus preventing the accumulation of dirt or dust in the well 115.

The external recombination system comprises a housing 120 arranged to be screwed down on collar 105 to form a fluid-tight seal therewith. Washers 121 and 122 are provided for this purpose. The recombination chamber 124 is defined within the upper portion of housing 120 and contains a suitable recombination-effecting means such as a wire 125 having electrical leads 126 extending externally of the housing.

The wire is surrounded by flash-suppressing beads 127 contained within a suitable foraminous container 128 suspended from the interior housing by lines 129. This recombination-effecting means is shown in FIG. 8 to be placed off-center of the chamber 124 in order to permit the valve to operate.

It will be seen FIG. 8 that the valve member 108 is moved downwardly and the fluid passage opened through the application of pressure by pressure applying member 130 on closure disk 111. This is done by turning screw 132 downwardly within the threaded extension 133 of the housing. O-ring 134 is provided to insure a fluid-tight seal. In operation, the housing is screwed on the battery collar with the screw 132 in its top-most position to avoid a premature opening of the valve when the housing is in place. Screw 132 is slowly turned to engage disk 111 and open the valve. Thus, the valve may be first just cracked to allow gas pressure to build up slowly in chamber 124 and to minimize the possibility of too rapid contact of the wire by the hydrogen and oxygen. The procedure described is reversed in removing the battery from the charge rack. It will be seen in FIG. 8 that the flash-suppressing beads 127 and the mechanism providing for the controlled operation of the valves make up the means to prevent the onrush of the gases into contact with the hot wire surface.

The recombination chamber and its associated parts may be formed of any material which is resistant to chemical attack by the electrolyte and the atmosphere within the battery. The various components may conveniently be molded from suitable plastic materials.

The recombination system of this invention provides an effective means for achieving the recombination of the hydrogen and oxygen gases generated by a secondary battery, particularly during charging. It provides complete protection of the catalyst or heated wire during those periods when the battery is in a position other than upright and affords means for preventing explosions when the gases are permitted to contact the catalyst. In the absence of such protection and control any catalyst would rapidly be poisoned and in such a case the gas pressure would buildup to result in fracturing of the battery housing.

During the recombination process it is preferred, although not always necessary, to heat the catalyst if it is used as a recombination effecting means. In the case of the wire it is, of course, heated during that period when the recombination chamber is in direct communication with the battery volume. This means that there are periods when it is not necessary to supply electrical energy from the battery for heating the catalyst or wire. Hence, the power drain on the battery is controlled and minimized.

By achieving efficient recombination of the hydrogen and oxygen gases the recombination system of this invention provides an inexpensive means for making a sealed secondary or storage battery. This in turn makes such batteries available as power sources for many devices in which they could not heretofore be used.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

We claim:

1. A sealed battery in which hydrogen and oxygen gases are generated, the improvement which comprises incorporating within the upper portion of the battery housing, out of contact with the electrode and active chemicals, a recombination system, comprising in combination
   (a) an enclosure defining a fluid chamber and having fluid port means;
   (b) externally-actuatable valve means adapted to control the passage of said gases and product liquid through said fluid port means, said valve means having control means external of the battery housing;
   (c) recombination-effecting means capable of effecting the reaction between gaseous hydrogen and oxygen to form water; and
   (d) gas onrush-preventing means adapted to control the rate at which said gases contact said recombination-effecting means.

2. A sealed battery according to claim 1 wherein said fluid chamber is affixed to the battery housing.

3. A sealed battery according to claim 1 wherein said externally-actuatable valve means is arranged to remain in the closed position in the absence of any external force applied thereto.

4. A sealed battery according to claim 1 wherein said recombination-effecting means is a wire capable of being electrically heated.

5. A sealed battery according to claim 1 wherein said recombination-effecting means is a catalyst.

6. A sealed battery according to claim 5 including externally-controllable means for heating said catalyst.

7. A sealed battery according to claim 6 wherein said means for heating said catalyst is a carbon resistor and said catalyst comprises a plurality of palladinized alumina pellets affixed to said resistor.

8. A sealed battery according to claim 1 wherein said gas onrush-preventing means are flash-suppressing means surrounding said recombination-effecting means.

9. A sealed battery according to claim 8 wherein said flash-suppressing means are small solid configurations formed of a material resistant to the internal environment of said battery and are further characterized as being of a size and number such that they generate a surface area and gas passages approximately equivalent to that generated by 12-mesh beads when surrounding said recombination-effecting means to a depth of at least about one-fourth inch with respect to all of the significant active surfaces of said recombination-effecting means.

10. A sealed battery according to claim 9 wherein said small solid configurations are beads.

11. A sealed battery according to claim 9 wherein said small solid configurations are rod-like members.

12. A sealed battery according to claim 1 wherein said gas onrush-preventing means comprises a gas-permeable, fluid-impermeable membrane forming a portion of the wall of said enclosure.

13. A sealed battery according to claim 1 wherein said gas onrush-preventing means comprises means for controlling the rate at which said valve means is actuated thereby to control the rate at which said gases enter said fluid chamber.

References Cited

UNITED STATES PATENTS

| | | | |
|---|---|---|---|
| 2,465,202 | 3/1949 | Craig | 136—179 |
| 3,038,954 | 6/1962 | Pattison et al. | 136—179 |
| 3,348,923 | 10/1967 | Demarest | 23—288 |

FOREIGN PATENTS

| | | |
|---|---|---|
| 303,799 | 4/1930 | Great Britain. |
| 339,824 | 12/1930 | Great Britain. |

ALLEN B. CURTIS, Primary Examiner

A. SKAPARS, Assistant Examiner

U.S. Cl. X.R.

136—179